(12) United States Patent
Crooks et al.

(10) Patent No.: US 11,017,192 B2
(45) Date of Patent: May 25, 2021

(54) SCAN DATA SOURCE IDENTIFICATION

(71) Applicant: NCR Corporation, Duluth, GA (US)

(72) Inventors: John Crooks, Duluth, GA (US); Deborah Ann Detwiler, Lawrenceville, GA (US)

(73) Assignee: NCR Corporation, Atlanta, GA (US)

(*) Notice: Subject to any disclaimer, the term of this patent is extended or adjusted under 35 U.S.C. 154(b) by 0 days.

(21) Appl. No.: 15/198,301

(22) Filed: Jun. 30, 2016

(65) Prior Publication Data

US 2018/0004998 A1    Jan. 4, 2018

(51) Int. Cl.
*G06K 7/14* (2006.01)
*G06K 7/10* (2006.01)
*G07G 1/00* (2006.01)

(52) U.S. Cl.
CPC ....... *G06K 7/1413* (2013.01); *G06K 7/10544* (2013.01); *G06K 7/10881* (2013.01); *G07G 1/0045* (2013.01); *G07G 1/0054* (2013.01); *G07G 1/0072* (2013.01)

(58) Field of Classification Search
CPC ............. G06K 7/1413; G06K 7/10544; G06K 7/10881; G07G 1/0045; G07G 1/0054; G07G 1/0072

USPC .................................................... 235/462.01
See application file for complete search history.

(56) References Cited

U.S. PATENT DOCUMENTS

| | | | | |
|---|---|---|---|---|
| 2008/0230607 | A1* | 9/2008 | Etten ................. | G06K 17/0022 235/435 |
| 2011/0284627 | A1* | 11/2011 | Stefani .................. | G06Q 90/20 235/375 |
| 2011/0297747 | A1* | 12/2011 | Naumovsky ........... | G06Q 30/08 235/462.13 |
| 2012/0125992 | A1* | 5/2012 | Nakagawa ............. | G06Q 50/10 235/375 |
| 2015/0302393 | A1* | 10/2015 | Poole ................... | G06Q 20/382 705/65 |

* cited by examiner

*Primary Examiner* — Michael G Lee
*Assistant Examiner* — David Tardif
(74) *Attorney, Agent, or Firm* — Schwegman, Lundberg & Woessner

(57) ABSTRACT

Various embodiments herein each include at least one of systems, methods, software, and firmware for scan data source identification. One such embodiment, in the form of a method, includes receiving a dataset including scan data from a particular scanning device and adding data to the received dataset identifying at least one of the particular scanning device and a type of the particular scanning device. The method may further send the dataset to a terminal for processing.

15 Claims, 4 Drawing Sheets

SCAN DATA SOURCE IDENTIFICATION

BACKGROUND INFORMATION

Point of Sale (POS) terminals traditionally have had only a single barcode scanner. Modern POS terminals commonly have two barcode scanners and more are being added all the time with the proliferation of lower cost, higher quality digital imaging devices. However, barcode scan data generally appears as a single data item within a POS terminal regardless of the barcode scanner, imaging device, or image view from which the barcode was read.

SUMMARY

Various embodiments herein each include at least one of systems, methods, software, and firmware for scan data source identification. One such embodiment, in the form of a method, includes receiving a dataset including scan data from a particular scanning device and adding data to the received dataset identifying at least one of the particular scanning device and a type of the particular scanning device. The method may further send the dataset to a terminal for processing.

Another method embodiment includes receiving scan data captured by a scanning device of a product scanner and applying at least one scan data processing rule to the received scan data to identify a further data processing activity to perform or to forbear from performing. This method further includes performing and forbearing from performing respective identified further data processing activities.

A further embodiment, in the form of a terminal, includes a plurality of scanning devices, at least one processor and at least one memory device, and an instruction set accessible in the at least one memory device and executable by the at least one processor to perform data processing activities. The data processing activities, in some embodiments, include receiving scan data captured by a scanning device of the plurality of scanning devices, applying at least one scan data processing rule to the received scan data to identify a further data processing activity to perform or to forbear from performing, and performing and forbearing from performing respective identified further data processing activities.

DETAILED DESCRIPTION

Figure 1:
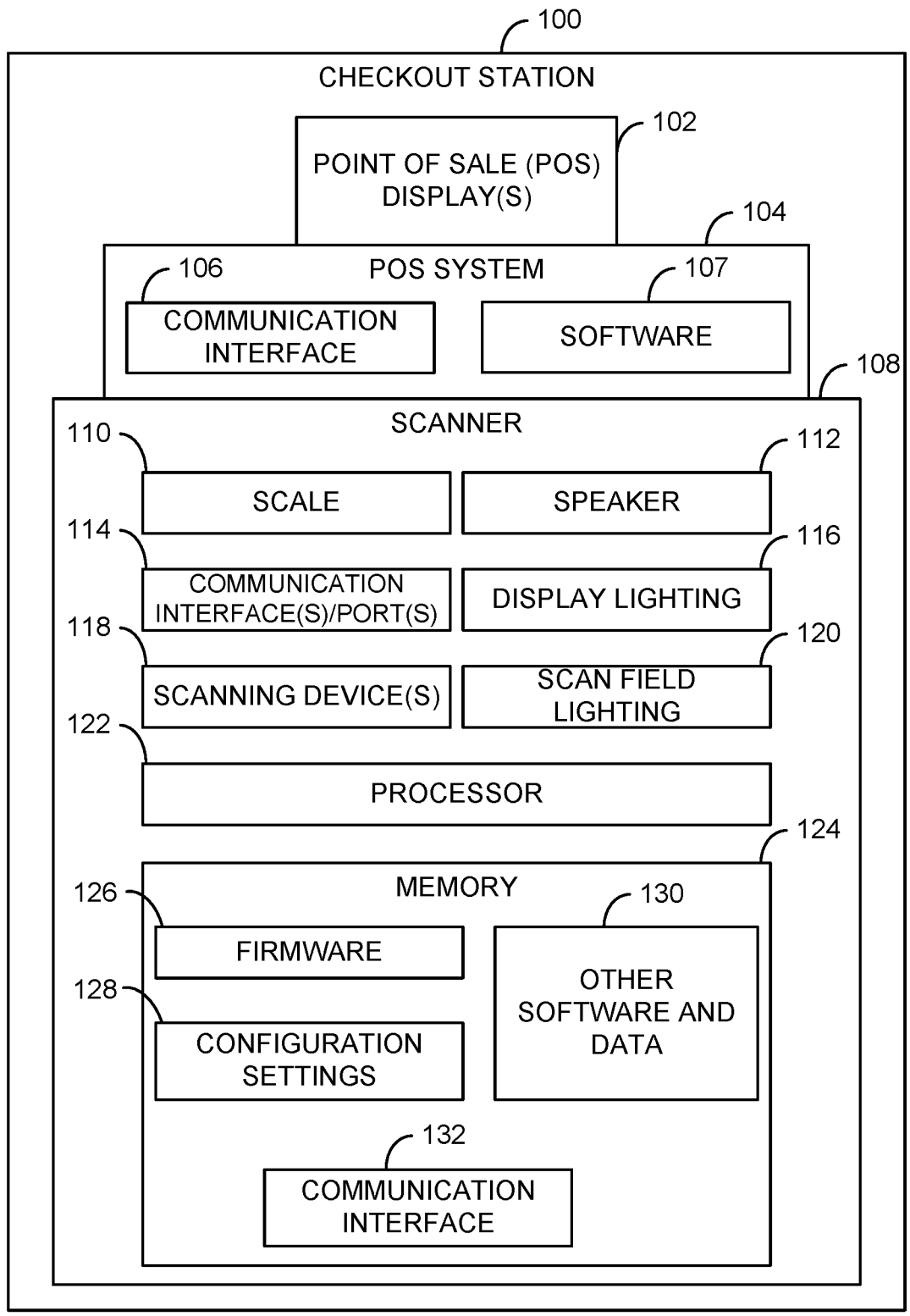
FIG. 1 is a diagram illustrating components of a checkout station having a scanner, according to an example embodiment.

Various embodiments each include at least one of systems, devices, methods, and software for scan data source identification. As mentioned above, barcode scan data generally appears as a single data item within a POS terminal regardless of the barcode scanner, imaging device, or image view from which the barcode was read at a checkout station. However, there are times when barcode scans should be treated differently based on a source scanning device. For example, if a handheld scanner device is used at a self-service Checkout Station (SSCO) while items are also being scanned by a hi-optic scanner, a rule may be implemented within the scanner or a computer controlling the SSCO to ignore scans from the handheld scanner as it is likely a child is playing with the handheld scanner. Similarly, certain barcode types may be associated with certain levels of security or for other reasons may be limited to being scanned only by a certain scanning device. Thus, when a barcode with limited source is received, unless it is received from the appropriate source device, the barcode is ignored.

Some of the various embodiments herein are built upon platforms that add source device data to scan data that is received by a computer controlling a POS terminal from a scanner or scanning device or taking into account a physical or virtual port through which scan data has been received. This source data may then be utilized in some embodiments for the application of rules to determine what to do with received scan data, whether that includes certain data processing activities, traditional processing, or forbearing from performing certain or all data processing activities. Such embodiments provide greater flexibility at the checkout station over conventional scan solutions that do not provide data or mechanisms by which a source scanning device can be identified.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a diagram illustrating components of a checkout station 100 including a POS system 104 and scanner 108, according to an example embodiment. It is to be noted that the checkout station 100 is shown schematically in greatly simplified form, with example components relevant to understanding various embodiments herein. The same situation may be true for the other various components of the checkout station 100. Also, note that the checkout station 100 may include more or fewer components in some embodiments.

Furthermore, the various components included in FIG. 1 as illustrated and arranged are provided for illustration purposes only. It is to be noted that other arrangements with more or fewer components are possible without departing from the contributions herein, in particular with regard to continuous shrink reduction system sensitivity adjustment.

Moreover, the methods, POS terminal 104, and scanner 108 presented herein and below may include all or some combination of the components shown in the context of the checkout station 100. Further, although a checkout station 100 is illustrated as including a scanner 108, the scanner 108 may be a standalone element or an element of other systems, devices, and terminals in other embodiments. Further, the scanner 108 and POS terminal 104 may include additional scanning devices coupled thereto, such as may be connected via wired or wireless connections to the communication interface(s)/port(s) 114 of the scanner 108. Examples of other terminal-types that may include a scanner 108 are self-service terminals (SSTs) such as SSCO terminals, POS terminals, clerk operated and self-service library checkout stations, time-keeping terminals, and the like. Additionally, references to POS terminals herein and in the claims are general references to both POS and SSCO terminals, unless expressly stated otherwise.

The methods of some embodiments are programmed as executable instructions stored in memory and/or non-transitory computer-readable storage media and executed on one or more processors associated with the components and devices herein.

The checkout station 100 includes one or more POS displays 102 that present information of a POS system 104 coupled to the one or more POS displays 102. Information presented by the one or more POS displays 102 includes information relevant in a retail context and with regard to operation of the checkout station 100. The checkout station 100 also includes the scanner 108.

The scanner 108 may be referred to as a barcode scanner or product scanner as those are the tasks most commonly associated with such devices. During operation of the checkout station 100, items are placed within a scan field of the scanner 108. One or more scanning devices 118 of the scanner 108, such as one or more cameras and laser scanners then scan a barcode and information read therefrom is communicated to the POS system 104. The POS system 104 then uses that data to identify the item placed within the scan field of the scanner 108 and performs an additional function. The additional function may include a price lookup and addition of the item to a list of items to be purchased, which may be presented on the one or more POS displays 102. As noted above, the scanner 108 may also include other scanning devices coupled thereto, such as handheld scanning devices and the like.

The scanner 108 may include one or more scan fields, such as two scan fields of bi-optic scanners that are commonly seen in grocery and discount retail outlets. Each scan field may include one or more imaging devices 118, such as cameras. In some embodiments, a total of four or more cameras may be included in one or both of the scan fields, combined. In addition to the scanning devices 118, the scanner 108 may include various other components. The various other components may include an integrated scale 110 such as may be used in a grocery outlet to weigh items such as produce and one or both of a speaker 112 and display lighting 116 to output audio a visual signals such as signals of (un)successful scans. The scanner 108 may also include scan field lighting 120 that may be turned on and off and adjusted based on a detected presence of an item to be scanned. The scanner 108 also includes one or more of at least one of a hardware communication interface 114 or a software or firmware communication interface 132 that enables to scanner to communicate with at least the POS system 104 communication interface 106 and, in some embodiments, over a network.

During typical operation, the scanner 108 is operated according to instructions executed on a processor 122. The processor may be a single or multi-core ASIC, digital signal processor, microprocessor, or other type of processor. The instructions may be firmware 126 or software 130 stored in one or more memories 124. The one or more memories 124 may be or include volatile and non-volatile memories, write-protected memories, write-once memories, random access memory (RAM), read only memories (ROM), and other memory and data storage types and devices. The additional function may also include one or more fraud-detection process that declares security events in view of one or more fraud-detection thresholds at the checkout station 100. Some embodiments of the checkout station 100 also include a bagging area scale (not illustrated) that is coupled to the POS system 104. When a product is scanned, a weight of the product may be looked up the POS system 104 and that weight, within a threshold, must be detected before proceeding with scanning of another product unless that process is bypassed according to some embodiments.

Instructions of software 107 that control operation of the POS system 104 may be stored in a memory device of the POS system and may include, for example, fraud-detection processes, operation adjustment rules, scan data data processing, among other functions of the scanner 108 and the POS system 104.

Instructions that control operation of the scanner 108 may be stored in firmware 126 or as software 130 in memory 124. These instructions are typically executed according configuration settings stored in the memory 124. The instructions may execute in view of configuration settings 128, which may also configure operation of the scanner 108 and the various components therein. For example, the configuration settings 108 may configure speaker 112 volume, display lighting 116 outputs, scan field lighting 120 brightness, decoding algorithm of the scanning device(s) 118 and the instructions, one or more communication protocols used to communicate data from the scanner 108 to the POS system 104, such as via a wired or wireless communication interface 106 of the POS system 104, scale 110 operating parameters (e.g., unit of measure as pounds or kilograms), among other configuration settings the particular scanner 108 of an embodiment may include. In some embodiments, the configuration settings 128 may include a firmware version, a software version, and the like. Thus, when a configuration is set or updated, the setting or updating of the configuration settings 128 may include population and updates of any of the configuration settings 128 of a particular embodiment, including an update to firmware and software present on the scanner. The software 130 may also include one or more scan data processing processes that are executed on the scanner 108.

Figure 2:
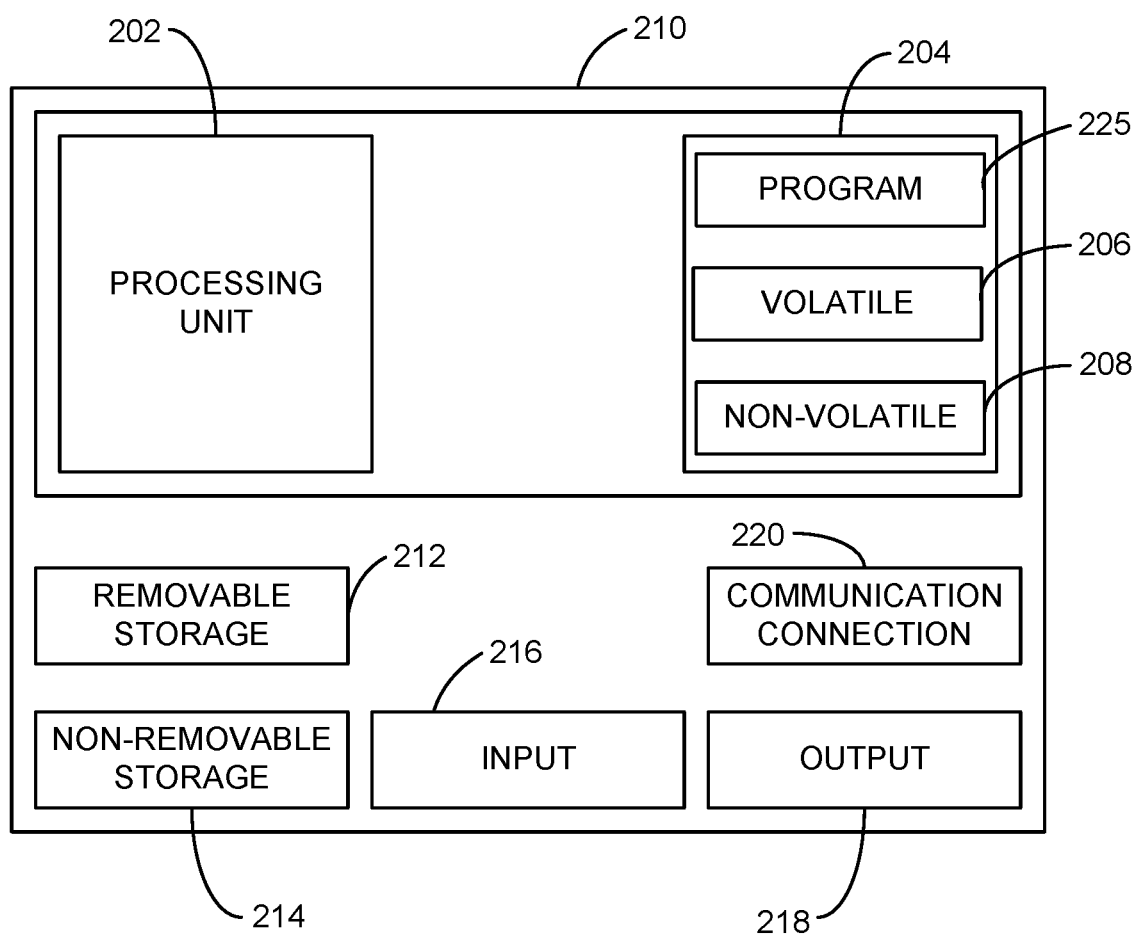
FIG. 2 is a block diagram of a computing device, according to an example embodiment.

FIG. 2 is a block diagram of a computing device, according to an example embodiment. In one embodiment, multiple such computer systems are utilized in a distributed network to implement multiple components in a transaction-based environment. The computing device, in some embodiments, is a computing device of a POS terminal, such as the POS system 104 of FIG. 1. In other embodiments, the computing device is a mobile device implemented as or as part of a POS terminal.

An object-oriented, service-oriented, or other architecture may be used to implement such functions and communicate between the multiple systems and components. One example computing device in the form of a computer 210, may include a processing unit 202, memory 204, removable storage 212, and non-removable storage 214. Although the example computing device is illustrated and described as computer 210, the computing device may be in different forms in different embodiments. For example, the computing device may instead be a smartphone, a tablet, smartwatch, or other computing device including the same or similar elements as illustrated and described with regard to FIG. 2. Devices such as smartphones, tablets, and smartwatches are generally collectively referred to as mobile devices. Further, although the various data storage elements are illustrated as part of the computer 210, the storage may also or alternatively include cloud-based storage accessible via a network, such as the Internet.

Returning to the computer 210, memory 204 may include volatile memory 206 and non-volatile memory 208. Computer 210 may include—or have access to a computing environment that includes a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 210 may include or have access to a computing environment that includes input 216, output 218, and a communication connection 220. The input 216 may include one or more of a touchscreen, touchpad, mouse, keyboard, camera, one or more device-specific buttons, one or more sensors integrated within or coupled via wired or wireless data connections to the computer 210, and other input devices. The computer 210 may operate in a networked environment using a communication connection 220 to connect to one or more remote computers, such as database servers, web servers, and other computing device. An example remote computer may include a personal computer (PC), server, router, network PC, a peer device or other common network node, or the like. The communication connection 220 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 220 may also or alternatively include a transceiver device, such as a BLUETOOTH® device that enables the computer 210 to wirelessly receive data from and transmit data to other BLUETOOTH® devices.

Computer-readable instructions stored on a computer-readable medium are executable by the processing unit 202 of the computer 210. A hard drive (magnetic disk or solid state), CD-ROM, and RAM are some examples of articles including a non-transitory computer-readable medium. For example, various computer programs 225 or apps, such as one or more applications and modules implementing one or more of the methods illustrated and described herein or an app or application that executes on a mobile device or is accessible via a web browser, may be stored on a non-transitory computer-readable medium. In some embodiments, the computer-readable instructions include one or both of fraud-detection processes, threshold-setting rules, processes that are executable to apply the threshold-setting rules, and make changes to threshold of the fraud-detection processes.

Figure 3:
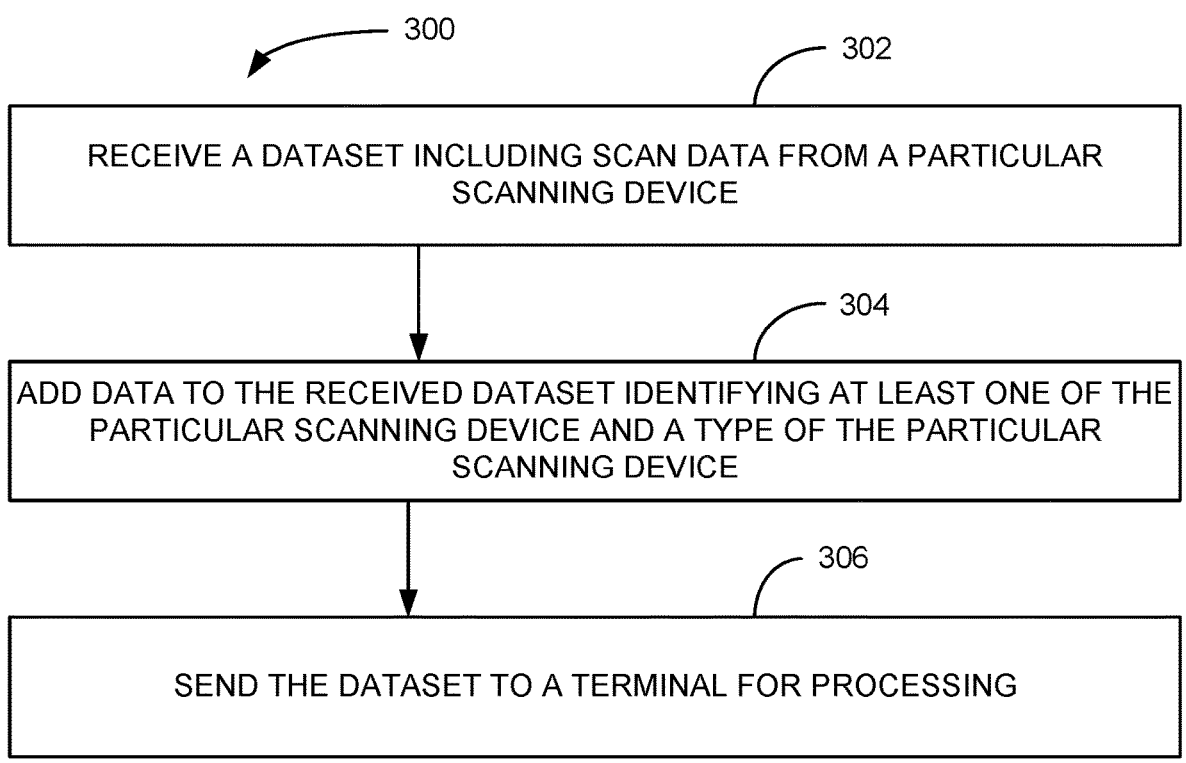
FIG. 3 is a block flow diagram of a method, according to an example embodiment.

FIG. 3 is a block flow diagram of a method 300, according to an example embodiment. The method 300 is an example of an embodiment that may be implemented within scanner, such as scanner 108 of FIG. 1.

The method 300 includes receiving 302 a dataset including scan data from a particular scanning device, such as one of the scanning devices 118 or other scanning devices that may be coupled to the communication interface(s)/port(s) 114. The method 300 further includes adding 304 data to the received dataset identifying at least one of the particular scanning device and a type of the particular scanning device (e.g., bi-optic, handheld, laser, etc.). The method 300 may then send 306 the dataset to a terminal, such as the POS system 104, for processing.

In some embodiments of the method 300, the particular scanning device is one of a plurality of scanning devices coupled to a scanner that performs the method. Further, the at least one of the plurality of scanning devices may be a scanning device including an imaging device that captures an image of a barcode and reads data from the barcode that is included in the dataset.

In another embodiment, the particular scanning device, and the dataset received 302 therefrom, is received 302 via a physical connection port registered within configuration data to the particular scanning device. Such embodiments further include adding 304 the data to the received dataset identifying at least one of the particular scanning device and the type of the particular scanning device is performed based at least in part on the configuration data. In some embodiments, the received 302 dataset is formatted according to a defined format and adding the data to the received dataset includes adding 304 data representative of at least one of the particular scanning device and the type of the particular scanning device an unused area of the defined format of the received dataset.

Figure 4:
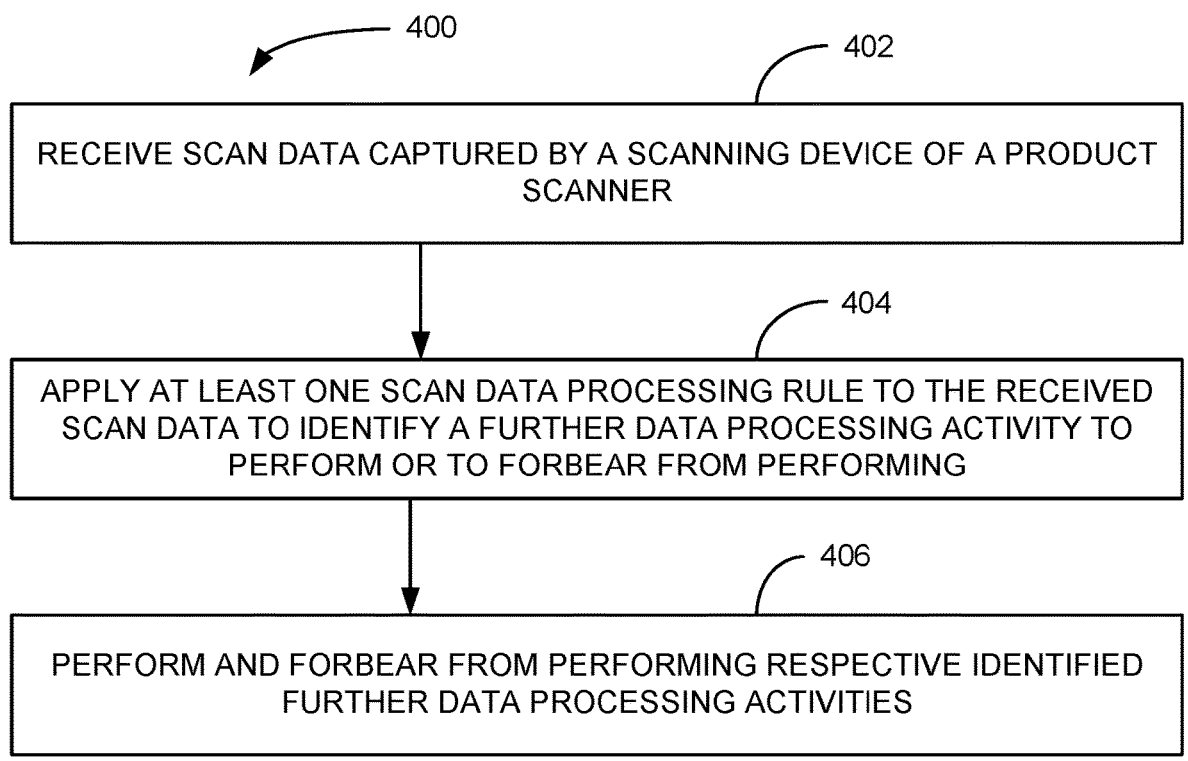
FIG. 4 is a block flow diagram of a method, according to an example embodiment.

FIG. 4 is a block flow diagram of a method 400, according to an example embodiment. The method 400 is an example of a method that may be performed by a computer controlling a checkout station, such as the POS system 104 of FIG. 1.

The method 400 includes receiving 402 scan data captured by a scanning device of a product scanner and applying 404 at least one scan data processing rule to the received scan data to identify a further data processing activity to perform or to forbear from performing. The method 400 may then perform and forbear 406 from performing respective identified further data processing activities.

In some embodiments of the method 400, the received 402 scan data includes data identifying at least one of a particular scanning device and a scanning device type of the scanning device that captured barcode data of the scan data. In one such embodiment, at least one scan data processing rule identifies a further data processing activity when either a particular scanning device or a particular scanning device type captured the barcode data. An identified data processing activity may be identified when a barcode is read by a particular scanning device type and the data processing activity identified is an activity including storing a representation of the barcode data with an indication or association with data to the particular scanning device type that read the barcode data.

As mentioned above, the method 400 is performed by a computing device controlling operation of a terminal, such as the POS system 104 of the checkout station 100 in FIG. 1. In some embodiments, the terminal is operated by a user logged in with a user identifier and the storing of the representation of the barcode data with the indication or association with data to the particular scanning device type that read the barcode data is stored in further association with the user identifier.

In some embodiments, the particular scanning device type that identified the data processing activity is a scanning device type other than a scanning device internal to a scanner/scale device, such as a handheld scanner as opposed to a bi-optic scanner.

In some embodiments of the method 400, the data processing activity is to forbear from processing the received scan data within a current transaction.

In some embodiments when the checkout station includes a scale in the bagging area of an SSCO, when the received 402 scan data includes data identifying a handheld scanning device type or a particular scan device known to be of the handheld scanning device type, the method 400 includes forbearing from enforcement of bagging area scale functionality of a self-service checkout with regard to a product for which scan data was received.

In some further embodiments of the method 400, the at least one data processing rule includes a particular data processing rule that evaluates a type of barcode data included in the scan data and a source scanning device or scanning device type used to scan a barcode from which the barcode data was read. In one such embodiment, the type of barcode is a barcode of a customer loyalty card and the source scanning or scanning device type used to scan the barcode is limited to a limited set of scanning devices or scanning device types such that application of the particular data processing rule requires that customer loyalty card barcodes be read by a limited set of scanning devices.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    receiving scan data captured by a particular scanning device of a product scanner, the scan data including barcode data; the particular scanning device being one of a plurality of scanning devices that communicate with a terminal that receives the scan data and performs the method;
    adding data to the received scan data, the added data identifying the particular scanning device and a type of the particular scanning device;
    applying at least one scan data processing rule to the received scan data to identify a further data processing activity to perform or to forbear from performing based on the barcode data and at least in part on one of the particular scanning device and the type of the particular scanning device; and
    forbearing from performing respective identified further data processing activities when the at least one scan data processing rule indicates a product of the barcode data is not to be scanned with the particular scanning device.

2. The method of claim 1, wherein the received scan data includes data identifying the particular scanning device and scanning device type of the scanning device that captured barcode data of the scan data.

3. The method of claim 2, wherein at least one scan data processing rule identifies a further data processing activity when either a particular scanning device or a particular scanning device type captured the barcode data.

4. The method of claim 2, wherein an identified data processing activity is identified when a barcode is read by a particular scanning device type and the data processing activity identified is an activity including storing a representation of the barcode data with an indication or association with data to the particular scanning device type that read the barcode data.

5. The method of claim 4, wherein the method is performed by a computing device controlling operation of a terminal.

6. The method of claim 5, wherein the terminal is operated by a user logged in with a user identifier and the storing of the representation of the barcode data with the indication or association with data to the particular scanning device type that read the barcode data is stored in further association with the user identifier.

7. The method of claim 4, wherein the particular scanning device type that identified the data processing activity is a scanning device type other than a scanning device internal to a scanner/scale device.

8. The method of claim 4, wherein the data processing activity is to forbear from processing the received scan data within a current transaction.

9. The method of claim 1, wherein when the received scan data includes data identifying a handheld scanning device type or a particular scan device known to be of the handheld scanning device type, forbearing from enforcement of bagging area scale functionality of a self-service checkout with regard to a product for which scan data was received.

10. The method of claim 1, wherein the at least one data processing rule includes a particular data processing rule that evaluates a type of barcode data included in the scan data and a source scanning device or scanning device type used to scan a barcode from which the barcode data was read.

11. The method of claim 10, wherein for the particular data processing rule, the type of barcode is a barcode of a customer loyalty card and the source scanning or scanning device type used to scan the barcode is limited to a limited set of scanning devices or scanning device types such that application of the particular data processing rule requires that customer loyalty card barcodes be read by a limited set of scanning devices.

12. A terminal comprising:
    a plurality of scanning devices;

at least one processor and at least one memory device; and an instruction set accessible in the at least one memory device and executable by the at least one processor to perform data processing activities, the data processing activities comprising:

receiving scan data captured by a scanning device of the plurality of scanning devices, the scan data including barcode data;

adding data to the received scan data, the added data identifying the particular scanning device and a type of the particular scanning device;

applying at least one scan data processing rule to the received scan data to identify a further data processing activity to perform or to forbear from performing based on the barcode data and at least in part on one of the particular scanning device and the type of the particular scanning device; and forbearing from performing respective identified further data processing activities when the at least one scan data processing rule indicates a product of the barcode data is not to be scanned with the particular scanning device.

13. The terminal of claim 12, wherein the received scan data includes data identifying the particular scanning device and the scanning device type of the scanning device that captured barcode data of the scan data.

14. The terminal of claim 12, wherein at least one scan data processing rule identifies a further data processing activity when either a particular scanning device or a particular scanning device type captured the barcode data.

15. The terminal of claim 12, wherein an identified data processing activity is identified when a barcode is read by a particular scanning device type and the data processing activity identified is an activity including storing a representation of the barcode data in the at least one memory device with an indication or association with data to the particular scanning device type that read the barcode data.

* * * * *